(12) United States Patent
Johnson et al.

(10) Patent No.: US 10,907,867 B2
(45) Date of Patent: Feb. 2, 2021

(54) EVAPORATIVE CHILLING SYSTEMS AND METHODS USING A SELECTIVE TRANSFER MEMBRANE

(71) Applicant: Dais Analytic Corporation, Odessa, FL (US)

(72) Inventors: Brian Johnson, Land O'lakes, FL (US); Lacy Aliff, Tampa, FL (US); Gary Rosenberg, Safety Harbor, FL (US)

(73) Assignee: DAIS ANALYTIC CORPORATION, Odessa, FL (US)

( * ) Notice: Subject to any disclaimer, the term of this patent is extended or adjusted under 35 U.S.C. 154(b) by 42 days.

(21) Appl. No.: 15/766,064

(22) PCT Filed: Oct. 7, 2016

(86) PCT No.: PCT/US2016/056064
§ 371 (c)(1),
(2) Date: Apr. 5, 2018

(87) PCT Pub. No.: WO2017/062812
PCT Pub. Date: Apr. 13, 2017

(65) Prior Publication Data
US 2018/0299170 A1 Oct. 18, 2018

Related U.S. Application Data

(60) Provisional application No. 62/238,433, filed on Oct. 7, 2015.

(51) Int. Cl.
*F25B 39/00* (2006.01)
*B01D 53/22* (2006.01)
(Continued)

(52) U.S. Cl.
CPC ............. *F25B 39/00* (2013.01); *B01D 53/22* (2013.01); *B01D 53/229* (2013.01); *B01D 53/26* (2013.01);
(Continued)

(58) Field of Classification Search
CPC ........ B01D 53/22; B01D 53/72; B01D 53/74; B01D 53/78; B01D 53/81; B01D 53/229;
(Continued)

(56) References Cited

U.S. PATENT DOCUMENTS 4,062,197 A * 12/1977 Hester .................. B01D 61/025
62/101
4,593,534 A * 6/1986 Bloomfield ............... F25B 1/00
417/48

(Continued)

FOREIGN PATENT DOCUMENTS

| CN | 103153434 | 6/2013 |
| WO | WO 2005/030812 | 4/2005 |
| WO | 2012/033827 | 3/2012 |

*Primary Examiner* — Frantz F Jules
*Assistant Examiner* — Martha Tadesse
(74) *Attorney, Agent, or Firm* — Saliwanchik, Lloyd & Eisenschenk (57) ABSTRACT

Compact membrane evaporative chillers, methods for cooling a process fluid (e.g., air) using a compact membrane evaporative chiller, and air conditioning systems and methods that include a compact membrane evaporative chiller are disclosed herein. Compact membrane evaporative chillers as disclosed herein can advantageously reduce or eliminate power consumption needed to circulate a working fluid.

19 Claims, 4 Drawing Sheets

(51) Int. Cl.

| | |
|---|---|
| *B01D 53/26* | (2006.01) |
| *F28F 13/00* | (2006.01) |
| *F25B 39/02* | (2006.01) |
| *B01D 53/72* | (2006.01) |
| *B01D 53/81* | (2006.01) |
| *B01D 53/74* | (2006.01) |
| *F25D 17/06* | (2006.01) |
| *B01D 53/78* | (2006.01) |
| *F01K 25/06* | (2006.01) |
| *F28D 1/053* | (2006.01) |
| *F28D 21/00* | (2006.01) |
| *F24F 5/00* | (2006.01) |

(52) U.S. Cl.
CPC ........... *B01D 53/268* (2013.01); *B01D 53/72* (2013.01); *B01D 53/74* (2013.01); *B01D 53/78* (2013.01); *B01D 53/81* (2013.01); *F01K 25/06* (2013.01); *F25B 39/02* (2013.01); *F25D 17/06* (2013.01); *F28D 1/05366* (2013.01); *F28D 21/0015* (2013.01); *F28F 13/003* (2013.01); *F24F 5/0035* (2013.01); *F25B 2339/047* (2013.01); *F28D 2021/0068* (2013.01)

(58) Field of Classification Search
CPC ....... B01D 53/268; B01D 53/26; F01K 25/06; F25D 17/06; F25B 2339/047; F28F 13/003; F28D 21/0015; F28D 1/05366
See application file for complete search history.

(56) References Cited

U.S. PATENT DOCUMENTS

| | | | | |
|---|---|---|---|---|
| 4,635,709 A * | 1/1987 | Altoz | ............... | F28D 15/0233 165/104.33 |
| 4,725,359 A * | 2/1988 | Ray | ............... | B01D 53/268 210/640 |
| 4,746,437 A * | 5/1988 | Koseki | ............... | F25B 15/14 210/640 |
| 4,896,515 A * | 1/1990 | Endou | ............... | F25B 1/10 62/498 |
| 5,468,574 A | 11/1995 | Ehrenberg et al. | | |
| 5,556,539 A * | 9/1996 | Mita | ............... | B01D 61/362 210/195.2 |
| 5,679,482 A | 10/1997 | Ehrenberg et al. | | |
| 6,110,616 A | 8/2000 | Sheikh-Ali et al. | | |
| 6,167,721 B1 * | 1/2001 | Tsenter | ............... | C09K 5/08 62/259.2 |
| 6,306,419 B1 | 10/2001 | Vachon et al. | | |
| 6,383,391 B1 | 5/2002 | Ehrenberg et al. | | |
| 6,413,298 B1 | 7/2002 | Wnek et al. | | |
| 6,841,601 B2 | 1/2005 | Serpico et al. | | |
| 7,179,860 B2 | 2/2007 | Cao et al. | | |
| 7,582,702 B2 | 9/2009 | Wright et al. | | |
| 7,585,916 B2 | 9/2009 | Wright et al. | | |
| 7,592,390 B2 | 9/2009 | Bening et al. | | |
| 7,625,979 B2 | 12/2009 | Atwood et al. | | |
| 7,737,224 B2 | 6/2010 | Willis et al. | | |
| 7,847,022 B2 | 12/2010 | Wright et al. | | |
| 7,887,926 B2 | 2/2011 | Ober et al. | | |
| 7,919,565 B2 | 4/2011 | Willis et al. | | |
| 7,977,432 B2 | 7/2011 | Bening et al. | | |
| 7,981,970 B2 | 7/2011 | Willis et al. | | |
| 8,470,071 B2 | 6/2013 | Ehrenberg et al. | | |
| 8,500,960 B2 * | 8/2013 | Ehrenberg | ............... | B01D 71/82 202/168 |
| 9,283,518 B2 | 3/2016 | Ehrenberg et al. | | |
| 9,393,557 B2 | 7/2016 | Ehrenberg et al. | | |
| 2002/0066277 A1 * | 6/2002 | Tsenter | ............... | F25B 27/00 62/46.2 |
| 2002/0073718 A1 * | 6/2002 | Maisotsenko | ............... | F24F 5/0035 62/121 |
| 2003/0014983 A1 * | 1/2003 | Maisotsenko | ............... | F28D 5/02 62/121 |
| 2004/0142910 A1 | 7/2004 | Vachon et al. | | |
| 2006/0292208 A1 | 12/2006 | Vachon | | |
| 2008/0141179 A1 | 6/2008 | Wulfe et al. | | |
| 2008/0185346 A1 * | 8/2008 | Xiong | ............... | C02F 1/4691 204/554 |
| 2009/0002984 A1 | 1/2009 | Liu et al. | | |
| 2010/0132386 A1 * | 6/2010 | Bahar | ............... | F25B 1/00 62/115 |
| 2010/0170776 A1 | 7/2010 | Ehrenberg et al. | | |
| 2010/0319370 A1 * | 12/2010 | Kozubal | ............... | F28D 21/0015 62/92 |
| 2011/0266219 A1 * | 11/2011 | Meuleman | ............... | B01D 63/02 210/640 |
| 2012/0048803 A1 * | 3/2012 | Shapiro | ............... | C02F 1/041 210/640 |
| 2013/0298766 A1 * | 11/2013 | Ehrenberg | ............... | B01D 53/268 95/52 |
| 2013/0312445 A1 * | 11/2013 | Isetti | ............... | F24F 3/1417 626/271 |
| 2013/0340468 A1 * | 12/2013 | Ma | ............... | F24F 3/1417 62/476 |
| 2014/0263060 A1 | 9/2014 | Summers | ............... | C02F 1/447 210/640 |
| 2015/0114829 A1 * | 4/2015 | Bahar | ............... | F24H 9/2021 204/230.2 |
| 2015/0233588 A1 * | 8/2015 | Betts | ............... | F28D 7/106 62/271 |
| 2015/0323226 A1 * | 11/2015 | Haraki | ............... | F25B 13/00 62/324.1 |
| 2018/0320988 A1 * | 11/2018 | Johnson | ............... | F28F 3/10 |

* cited by examiner

EVAPORATIVE CHILLING SYSTEMS AND METHODS USING A SELECTIVE TRANSFER MEMBRANE

CROSS-REFERENCE TO RELATED APPLICATIONS

This application is the U.S. national stage application of International patent application No. PCT/US2016/056064, filed Oct. 7, 2016, which claims the benefit of U.S. Provisional Application No. 62/238,433, filed Oct. 7, 2015, the disclosures of which are hereby incorporated by reference in their entireties, including any figures, tables, or drawings.

GOVERNMENT RIGHTS STATEMENT

This invention was made with government support under Contract No. DE-AR0000371 awarded by the Department of Energy Advanced Research Projects Agency-Energy (ARPA-E). The Government has certain rights in the invention.

BACKGROUND

The vast majority of heat pumps and refrigeration systems today employ variations on the vapor-compression thermodynamic cycle. This approach changes the pressure of an inert working fluid to manipulate its associated saturation temperature, which allows for the transfer of sensible heat across a metal surface as the fluid changes phase. This technology is mature and has been heavily developed, but there remain several limitations. For example, many of the most efficient refrigerants have undesirable effects on the atmosphere such as depletion of the ozone layer by chlorofluorocarbon (CFC) and hydrochlorofluorocarbon (HCFC) refrigerants. Although hydrofluorocarbon (HFC) refrigerants do not deplete the ozone layer, they have significant direct global warming potentials (GWP). Even though refrigerants are nominally contained within a closed system, current industry practices added the equivalent of 144.9 metric tons of $CO_2$ to the atmosphere in 2007 through the release of these high Global Warming Potential (GWP) gases. Further, the use of sensible heat transfer across the walls which isolate the refrigerant tend to require sub-cooling below the saturation temperature of the moist air to decrease its water content through condensation, a requirement that limits the possible thermodynamic efficiency of the process.

Thus, there is a continuing need for improved air conditioning and refrigeration systems.

SUMMARY

In one aspect, the present disclosure provides a compact membrane evaporative chiller for cooling a process fluid. In one embodiment, the compact membrane evaporative chiller includes: a first selective transfer membrane; a heat exchanger adjacent a first side of the first selective transfer membrane, the heat exchanger configured to provide an inflow of uncooled process fluid into the heat exchanger and an outflow of cooled process fluid out of the heat exchanger; a working fluid compartment between the first selective transfer membrane and the heat exchanger configured to physically isolate a working fluid from the process fluid, and to provide at least a film of the working fluid adjacent the first side of the first selective transfer membrane and a first side of the heat exchanger; and a vapor chamber adjacent a second side of the first selective transfer membrane configured to maintain a partial pressure of the working fluid in the chamber less than a partial pressure of the same fluid in the working fluid compartment and to collect vapor of the working fluid transferred through the membrane and evaporated into the vapor chamber, wherein the compact membrane evaporative chiller is configured for transfer of heat from the heat exchanger to the working fluid in the working fluid chamber.

In another aspect, the present disclosure provides a method for cooling a process fluid using a compact membrane evaporative chiller as disclosed herein. In one embodiment, the method includes: providing an inflow of uncooled process fluid into the heat exchanger and an outflow of cooled process fluid out of the heat exchanger, wherein the heat exchanger is adjacent the first side of the first selective transfer membrane, and wherein the heat exchanger is configured to isolate the working fluid from the process fluid; providing the working fluid in the working fluid compartment between the first selective transfer membrane and the heat exchanger to provide at least a film of the working fluid adjacent to the first side of the first selective transfer membrane and the first side of the heat exchanger, maintaining a partial pressure of the working fluid in the vapor chamber adjacent to the second side of the first selective transfer membrane that is lower than the partial pressure of the working fluid in the working fluid compartment, resulting in transfer through the membrane and evaporation of at least a portion of the working fluid into the vapor chamber as vapor, wherein the evaporation of the working fluid causes sufficient heat to be transferred from the working fluid chamber to maintain the working fluid at a lower temperature than the process fluid, thus causing heat to be drawn from the process fluid such that the process fluid outflow is at a lower temperature than a temperature of the process fluid inflow.

In another aspect, the present disclosure provides an air conditioning system. In one embodiment, the air conditioning system includes: a chiller as described herein, wherein the process fluid is air and the working fluid is water; a compressor to compress water vapor transferred through the membrane from the working fluid and evaporated into the chamber; a condenser to condense the compressed water vapor into a condensate; and a pathway to return the condensate to the working fluid compartment.

In another aspect, the present disclosure provides a method of chilling air using an air conditioning system as described herein. In one embodiment, the method includes: providing an inflow of uncooled process air into the heat exchanger and an outflow of cooled process air out of the heat exchanger, wherein the heat exchanger is adjacent the first side of the first selective transfer membrane, and wherein the heat exchanger is configured to isolate the water working fluid from the process air; providing the water working fluid in the working fluid compartment between the first selective transfer membrane and the heat exchanger to provide at least a film of the water working fluid adjacent the first side of the first selective transfer membrane and the first side of the heat exchanger; maintaining a partial pressure of the water working fluid in the vapor chamber adjacent the second side of the first selective transfer membrane that is lower than the partial pressure of the water working fluid in the working fluid compartment, resulting in transfer through the membrane and evaporation of at least a portion of the water working fluid into the chamber as water vapor, wherein the evaporation of water working fluid causes sufficient heat to be transferred from the working fluid chamber to maintain the working fluid at a lower temperature than the process air, which thus causes heat to be drawn from the process air so that the process air outflow is at a lower temperature than the process air inflow; compressing the water vapor; transferring the compressed water vapor to a condenser to condense the compressed water vapor into a condensate; and returning the condensate to the working fluid compartment.

The methods and systems cited above can be suitable, for example, for both large and small air conditioning and heat pump applications. Due to the type of equipment and membrane structure the device will be compact and of light weight making it suitable for transportation applications as well as fixed installations. In certain embodiments, the methods and systems disclosed herein can offer advantages including one or more of demonstrable reductions in energy consumption; lower emissions resulting, for example, from lower energy consumption; and/or elimination or reduction of the use of harmful fluorocarbon producing refrigerant gases that can damage the ozone layer.

Definitions

As used herein, "a," "an," "the," and "at least one" are used interchangeably and mean one or more than one.

As used herein, the term "comprising," which is synonymous with "including" or "containing," is inclusive, open-ended, and does not exclude additional unrecited elements or method steps.

Also herein, the recitations of numerical ranges by endpoints include all numbers subsumed within that range (e.g., 1 to 5 includes 1, 1.5, 2, 2.75, 3, 3.80, 4, 5, etc.).

The above brief description of various embodiments of the present disclosure is not intended to describe each embodiment or every implementation of the present disclosure. Rather, a more complete understanding of the disclosure will become apparent and appreciated by reference to the following description and claims in view of the accompanying drawing. Further, it is to be understood that other embodiments may be used and structural changes may be made without departing from the scope of the present disclosure.

DETAILED DESCRIPTION OF ILLUSTRATIVE EMBODIMENTS

Various methods of conditioning a process fluid (usually, but not exclusively, air) through the movement of heat and/or mass through selective membranes are described, for example, in U.S. Pat. Nos. 8,470,071 B2 and 9,283,518 B2. This disclosure provides additional concepts that may provide important advantages to the user.

It is known in the art to provide a separate heat exchanger to draw heat from the process fluid into the working fluid, and then to circulate the working fluid to a separate evaporative chilling component. However, in this arrangement the working fluid warms as heat enters, and it progressively loses the temperature differential needed to drive heat transfer across the separating material. Often, this separate approach requires a high circulation rate for the working fluid to ensure that it exits from the heat exchanger and is rapidly replaced with cooler fluid, limiting the temperature rise. In turn, the power input to the circulation pump is an important parasitic load on the system.

For one or more of the embodiments disclosed herein, the need to pump condensate from the condenser saturation pressure up to atmospheric pressure before reintroducing it to the evaporative chiller may be eliminated. The embodiments disclosed herein can be applied independently of one another, but the combination can result in a system that can eliminate a high-head-pressure condensate pump, downsized the working fluid circulation pump by several order of magnitudes, and minimized the temperature differential between the chilled working fluid and the process fluid.

In certain embodiments the compact evaporative membrane chiller as disclosed herein can maintain a thin layer of the working fluid between the selective membrane and the metal heat exchange surfaces that promote heat transfer out of the process fluid and conduction through the working fluid to the molecules at the surface of the selective membrane. This heat can power the phase change as working fluid molecules evaporate through the membrane; without an adequate supply of heat, the temperature of the working fluid near the membrane can drop, and the rate of evaporation through the membrane can decrease. The geometry can be configured to provide adequate conductive heat transfer through the thin film of working fluid, Elimination of the temperature drop experienced by a circulating working fluid can raise the temperature of the working fluid sufficiently to draw the design heat load from the process fluid. The higher minimum vapor pressure can drive evaporation through the selective membrane to reduce the pressure ratio needed to pump or compress vapor molecules to a high enough energy state to reject enthalpy to the designated sink.

Since circulation rate is not critical, a substantially stagnant or slowly flowing working fluid can be used. This can reduce the size and parasitic energy consumption of the circulation pump, potentially by multiple orders of magnitude.

Evaporative chilling systems and methods including at least one selective transfer membrane are disclosed herein. Such systems and methods include at least one compact chiller that can employ a selective transfer membrane to control the separation and/or absorption of one fluid, or a component of one fluid, through a mechanism of controlled solid state permeation. For example, the separation of moisture through a phase change from a body of water to cool the body of water is desirable for a chiller. Such systems and methods can be used for a wide variety of applications including, for example, cooling air.

Selective Transfer Membranes

Many new methods of modifying the temperature and humidity of air and other fluids become possible when they are based on a material that can selectively transfer water molecules (or certain other targeted molecules) while preventing oxygen, nitrogen, and other components of air and common gases from passing from one surface of the membrane through to the second surface of the same membrane.

For example, a class of polymer membranes has been developed that uses a nanometer-scale organizational structure of bound electrical charges to selectively transfer water at a molecular level from the higher vapor pressure to the lower vapor pressure side. The membrane can self-organize into hydrophilic and hydrophobic domains that are contiguous from the first surface of the membrane to the second surface of the membrane. The contiguous hydrophobic domains can be substantially water and gas impermeable. The contiguous hydrophilic domains can be permeable to small molecules that have large dielectric constants while being substantially impermeable to large molecules, and both large and small molecules that have low dielectric constants. Permeability properties based on size and dielectric constant can make the membrane selective. Because the membrane is selective and severely restricts the transfer of oxygen, nitrogen, and/or other atmospheric gases, the driving force for moisture transfer can be largely independent of the partial pressure of the moisture. Useful exemplary polymers and methods of preparing such polymers are disclosed, for example, in U.S. Pat. No. 5,468,574 (Ehrenberg et al.), U.S. Pat. No. 5,679,482 (Ehrenberg et al.), U.S. Pat. No. 6,110,616 (Sheikh-Ali et al.), U.S. Pat. No. 6,306,419 (Vachon et al.); U.S. Pat. No. 6,383,391 (Ehrenberg et al.), U.S. Pat. No. 6,413,298 (Wnek et al.), U.S. Pat. No. 6,841,601 (Serpico et al.), U.S. Pat. No. 7,179,860 (Cao et al.), U.S. Pat. No. 7,582,702 (Wright et al.), U.S. Pat. No. 7,585,916 (Wright et al.), U.S. Pat. No. 7,592,390 (Bening et al.), U.S. Pat. No. 7,625,979 (Atwood et al.), U.S. Pat. No. 7,737,224 (Willis et al.), U.S. Pat. No. 7,847,022 (Wright et al.), U.S. Pat. No. 7,887,926 (Ober et al.), U.S. Pat. No. 7,919,565 (Willis et al.), U.S. Pat. No. 7,977,432 (Bening et al.), and U.S. Pat. No. 7,981,970 (Willis et al.); U.S. Patent Application Publication Nos. 2004/0142910 A1 (Vachon et al.), 2006/0292208 A1 (Vachon), and 2010/0170776 A1 (Ehrenberg et al.); PCT International Publication Nos. WO 2005/030812 A1 (Cao et al.), 2008/141179 A1 (Ehrenberg et al.), 2009/002984 A2 (Vachon et al.); and U.S. Ser. No. 61/293,637 (Ehrenberg).

In particular embodiments, at least one membrane includes a modified (for example, sulfonated, hydrogenated, dehydrogenated, reduced, imidated and/or amidated) macromolecule. The molecules (including macromolecules) included in the at least one membrane include, but are not limited to, nucleic acids (nucleotides), amino acids, peptides, polypeptides, proteins, glycoproteins, biopolymers, oligomers and/or polymers and/or copolymers containing, for example, either alkene and/or arene moieties.

Other materials can conceivably by used in these systems. Exemplary qualifications for a candidate material include, for example, selectivity (i.e., the ability to maintain a strong absolute pressure differential across the material without transferring excessive amounts of non-targeted gases through the material) and flux capability (i.e., the ability to rapidly transfer a target fluid (usually water) from one side of the material to the other).

Possible candidate materials include (but are not limited to) fluoropolymers (e.g., those available under the trade designation NAFION) used as proton exchange membranes, polyesters, polyurethanes, and desiccant-treated nonwovens similar to those used in energy recovery ventilators. In some embodiments the utility of these materials may be limited by factors including, for example, water flux rates, air permeability, and/or cost.

A general description of the membrane operation is to state that the water content within the membrane is in dynamic equilibrium with the vapor pressures present at the surfaces of that membrane. The membrane absorbs water molecules into its hydrophilic regions and allows the molecules to move within those regions. At the surfaces of the membrane, a dynamic equilibrium exists between water molecules that are absorbed from the surrounding fluid into the membrane and water molecules desorbed from the membrane into the fluid. In a situation with two membrane surfaces in close proximity but exposed to different vapor pressures reflecting different vapor concentrations (i.e. a thin membrane exposed to two different fluids), the mobility of water molecules within the membrane allows a dynamic equilibrium between the two surfaces, with more water molecules absorbing from the high vapor pressure fluid into the membrane than are desorbing and more water molecules desorbing from the membrane into the low vapor pressure fluid than are absorbing. Thus, the vapor pressure differential between the two surfaces drives a net flux of water molecules through the membrane.

The following examples are offered to further illustrate various specific embodiments and techniques of the present disclosure. It should be understood, however, that many variations and modifications understood by those of ordinary skill in the art may be made while remaining within the scope of the present disclosure. Therefore, the scope of the disclosure is not intended to be limited by the following examples.

Compact Membrane Chiller

One concept in this system is a compact membrane chiller that includes a selective transfer membrane that can transfer molecules of a working fluid across the membrane.

A membrane chiller can have a fluid at the first surface of the membrane that can be a liquid or liquid mixture containing water or other molecules that can transfer readily through the chosen membrane. When the second surface of the membrane is drawn down to a pressure lower than the vapor pressure of the liquid at the first surface, the flux of water molecules through the membrane includes a change in state from liquid on one side to vapor on the other. The heat of evaporation needed for this phase change can come from the liquid water that remains behind, thus reducing the temperature of the liquid, which is the principle of evaporative cooling. This cooling effect can be used to chill water for use in a sensible heat exchanger or coil.

The membrane chiller can have a variety of advantages compared to other chillers. For example, in certain embodiments, the membrane chiller does not require a refrigerant like those used in vapor compression cycles. The most common refrigerants can have significant global warming potentials and are under pressure to be phased out of common use, and low global warming potential refrigerants have not achieved the same level of commercial acceptance. For another example, evaporative chillers (known as "swamp coolers") have been used in dry climates, but they are unable to drop either the air temperature or the water temperature below the wet-bulb temperature of the outside air. Because the selective transfer membrane second surface can be operated below atmospheric pressure, the temperature of water in contact with the first surface can be taken down the atmospheric wet-bulb temperature to within a few degrees of freezing. The control of the second membrane surface pressure sets the temperature within the body of water in contact with the first surface of the membrane. The temperature range and control allows the chiller to function to smoothly adjust from air conditioning to becoming a refrigeration device.

In one aspect, the present disclosure provides a compact membrane evaporative chiller for cooling a process fluid. In one embodiment, the compact membrane evaporative chiller includes: a first selective transfer membrane; a heat exchanger adjacent a first side of the first selective transfer membrane, the heat exchanger configured to provide an inflow of uncooled process fluid into the heat exchanger and an outflow of cooled process fluid out of the heat exchanger; a working fluid compartment between the first selective transfer membrane and the heat exchanger configured to physically isolate a working fluid from the process fluid, and to provide at least a film of the working fluid adjacent the first side of the first selective transfer membrane and a first side of the heat exchanger; and a vapor chamber adjacent a second side of the first selective transfer membrane configured to maintain a partial pressure of the working fluid in the chamber less than a partial pressure of the same fluid in the working fluid compartment and to collect vapor of the working fluid transferred through the membrane and evaporated into the vapor chamber, wherein the compact membrane evaporative chiller is configured for transfer of heat from the heat exchanger to the working fluid in the working fluid chamber.

In certain embodiments, controlling the pressure in the vapor chamber sets the rate at which the working fluid is transferred through the membrane, and thus the evaporative cooling rate. Therefore controlling the pressure in the vapor chamber indirectly controls the equilibrium temperatures of the fluids in the compact membrane chiller. For embodiments in which the process fluid is warm enough or the saturation vapor pressure of the working fluid is low enough, it can even be possible to operate the chiller with a pressure in the vapor chamber above atmospheric pressure.

Figure 1:
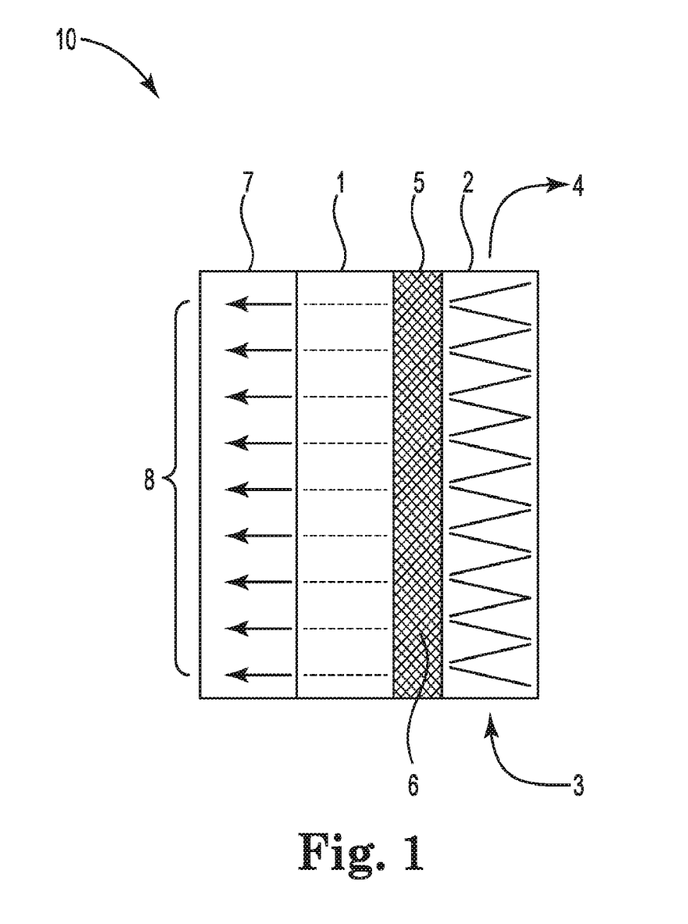
FIG. 1 is a schematic illustration of an exemplary embodiment of a compact membrane chiller.

Referring to FIG. 1, a schematic illustration of an exemplary embodiment of a compact membrane chiller 10 is illustrated. This figure is for illustration only. Various temperatures and properties referenced are not meant to limit the application in any way. Compact membrane chiller 10 includes selective transfer membrane 1 (which has been described herein above), heat exchanger 2, and vapor chamber 7.

Heat exchanger 2 is adjacent a first side of selective transfer membrane 1 and is configured to provide an inflow 3 of uncooled process fluid into heat exchanger 2 and an outflow 4 of cooled process fluid out of heat exchanger 2. In some embodiments, heat exchanger 2 includes metal, plastic, ceramic, or composite surfaces having a high surface area.

Compact membrane chiller 10 also includes working fluid compartment 5 between selective transfer membrane 1 and heat exchanger 2. Working fluid compartment 5 is configured to physically isolate working fluid 6 from the flowing process fluid (4, 5), and to provide at least a film of working fluid 6 adjacent the first side of selective transfer membrane 1 and a first side of heat exchanger 2. In some embodiments, working fluid compartment 5 includes a mesh capable of being filled with working fluid 6. In some embodiments, working fluid compartment 5 includes a porous foam capable of being filled with the working fluid. In exemplary embodiments, the mesh or porous foam can include metal, plastic, ceramic, composite, or combinations thereof. One of the primary objectives of including this mesh or porous foam in some preferred embodiments is to reduce the volume of the working fluid compartment and increase the thermal conductivity of the space between the first side of heat exchanger 2 and the selective transfer membrane 1, therefore reducing the temperature difference between those surfaces required to transfer a given amount of heat from the process fluid (4, 5) into the working fluid 6 being evaporated at the selective transfer membrane 1.

Compact membrane chiller 10 also includes vapor chamber 7 adjacent a second side of selective transfer membrane 1. Vapor chamber 7 is configured to maintain a partial pressure of working fluid 6 in the chamber less than a partial pressure of the same fluid 6 in the working fluid compartment. Vapor chamber 7 is also configured to collect vapor 8 of working fluid 6 transferred through the membrane and evaporated into vapor chamber 7. In some embodiments, working fluid vapor 8 in vapor chamber 7 is maintained at an absolute pressure less than atmospheric pressure.

Compact membrane chiller 10 is also configured for transfer of heat from heat exchanger 2 to working fluid 6 in working fluid chamber 5. The vapor pressure of a liquid is typically controlled by the fluid temperature, which sets the saturation pressure largely independently from the absolute pressure. This can allow a liquid at a sub-ambient absolute pressure to evaporate through the selective membrane into a vacuum plenum, from which the water molecules are drawn into the vapor compressor to maintain the vapor pressure differential across the membrane. The evaporative heat loss from this phase change can cool the working fluid and subsequently the process fluid.

Figure 2:
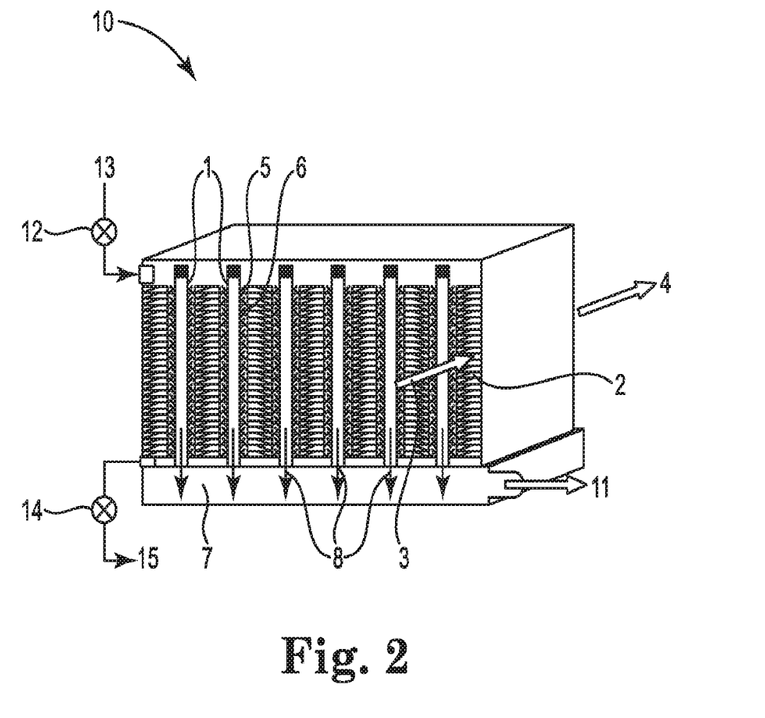
FIG. 2 is a perspective view of an exemplary embodiment of a compact membrane chiller.

FIG. 2 is an illustration of a perspective view of a compact membrane chiller 10 that is similar to the compact membrane chiller described in FIG. 1. In addition to the features of compact membrane chiller described herein above with respect to FIG. 1, compact membrane chiller 10 in FIG. 2 illustrates some additional features.

FIG. 2 illustrates pathway 11 where working fluid vapor 8 can be transferred from vapor chamber 7 to a compressor (not illustrated in FIG. 2). The compressor can compress working fluid vapor 7 that transferred through membrane 1 and evaporated into vapor chamber 7 such that the pressurized vapor can be cooled by a second working fluid stream in a condenser (e.g., a sensible condenser) that can provide condensed working fluid in a liquid state. In some embodiments, the compressor is a mechanical vapor compressor. In some embodiments, the compressor is an electrochemical vapor compressor. Optionally, the compressed working fluid vapor can be further cooled by passing through a desuperheat spray nozzle (further discussed below) to remove excess heat and provide cooled compressed working fluid vapor prior to passing the compressed working fluid vapor to the condenser.

The condenser (not illustrated in FIG. 2) can be a fluid cooling condenser, a radiative cooling condenser, a conductive cooling condenser, a thermoelectric cooling condenser, or a combination thereof. In certain embodiments, the condenser is an air cooled or water cooled sensible condenser.

In certain embodiments, compact membrane chiller 10 includes a pathway (not illustrated in FIG. 2) configured to return the condensed working fluid to working fluid compartment 5. In certain embodiments, compact membrane chiller 10 includes a metering pump configured to optionally divert a portion of the condensed working fluid from the return pathway to a desuperheat spray nozzle configured to spray atomized condensed working fluid into the vapor stream between the compressor and the condenser to create additional evaporative cooling.

In certain embodiments, the pathway to return the condensed working fluid to the working fluid compartment is configured to maintain working fluid compartment 5 at a pressure less than or equal to the pressure inside the condenser, which can allow the condensate to return to working fluid compartment 5 under the influence of gravity and/or pressure differentials.

In certain embodiments, compact membrane chiller 10 also includes a roughing pump (not illustrated in FIG. 2) connected to the condenser through an isolation valve and configured to optionally remove non-condensable gases.

In certain embodiments in which the compressor is an electrochemical compressor, compact membrane chiller 10 can further include a pressure regulation device configured to accept a mixture of working fluid vapor 8 and electrochemical carrier gas or gases from the return condensed working fluid pathway at a first pressure, and can be configured to reduce that pressure to a second, lower pressure that is sufficient to return the condensed working fluid to working fluid compartment 6 without compromising the partial pressure of the working fluid in vapor chamber 7.

In some embodiments, working fluid compartment 5 of compact membrane chiller 10 also includes inlet valve 12 for adding additional working fluid through inlet 13. In some embodiments, working fluid compartment 5 of compact membrane chiller 10 also includes drain valve 14 for draining working fluid and any dissolved solids through exit 15. In some embodiments, condensed working fluid can be removed from the chiller system and additional working fluid can be provided to the working fluid compartment, allowing the generation of a purified working fluid that has been distilled through selective transfer membrane 1, while other species and impurities have been removed from working fluid compartment 5 by draining a portion of the concentrated working fluid 6.

In certain embodiments where compact membrane chiller 10 includes a condenser, the condenser can optionally include a second selective transfer membrane, and the compressed vapor can be presented to a first surface of the second selective transfer membrane, and an exhaust fluid can be presented to a second surface of the second selective transfer membrane, wherein a partial pressure of the working fluid in the exhaust fluid is lower than the partial pressure of the working fluid at the first surface of the second selective transfer membrane, causing the transport of working fluid through the second selective transfer membrane.

In certain embodiments, working fluid 6 can further include at least one additional component that does not readily transfer through selective transfer membrane 1, and working fluid 6 and the at least one additional component can be in the form of a mixture, suspension, emulsion, slurry, colloid, or combination thereof.

In another aspect, the present disclosure provides a method for cooling a process fluid using a compact membrane evaporative chiller as described herein above. In one embodiment, the method includes: providing an inflow of uncooled process fluid into the heat exchanger and an outflow of cooled process fluid out of the heat exchanger, wherein the heat exchanger is adjacent the first side of the first selective transfer membrane, and wherein the heat exchanger is configured to isolate the working fluid from the process fluid; providing the working fluid in the working fluid compartment between the first selective transfer membrane and the heat exchanger to provide at least a film of the working fluid adjacent to the first side of the first selective transfer membrane and the first side of the heat exchanger; maintaining a partial pressure of the working fluid in the vapor chamber adjacent the second side of the first selective transfer membrane that is lower than the partial pressure of the working fluid in the working fluid compartment, resulting in transfer through the membrane and evaporation of at least a portion of the working fluid into the vapor chamber as vapor, wherein the evaporation of the working fluid causes sufficient heat to be transferred from the working fluid chamber to maintain the working fluid at a lower temperature than the process fluid, thus causing heat to be drawn from the process fluid such that the process fluid outflow is at a lower temperature than a temperature of the process fluid inflow.

In some embodiments, the process fluid can be air. In certain embodiments, the inflowing process fluid (e.g., uncooled air) can be at a temperature of −1° C. (30° F.) to 82° C. (180° F.). In certain embodiments, the outflowing process fluid (e.g., cooled air) can be at a temperature of −3° C. (26° F.) to 81° C. (179° F.).

In some embodiments, working fluid 6 is water. In certain embodiments, working fluid 6 can be maintained in working fluid chamber 5 at an average temperature of −4° C. (25° F.) to 80° C. (176° F.). In some embodiments, the partial pressure of the water working fluid in the vapor chamber is maintained at less than 47 kPa absolute pressure.

In certain embodiments, the distance across the working fluid from the surface of heat exchanger 2 to selective transfer membrane 1 is sufficiently small such that conductive heat transfer through that film is effective to transfer a desired quantity of heat from the process fluid to the evaporative surface of selective transfer membrane 1.

In certain embodiments, working fluid 6 can be maintained at a temperature in working fluid compartment 5 no higher than a chosen design value, without maintaining a mass flow of working fluid 6. In certain embodiments, the working fluid may be water with a thermal conductivity of 0.6 W/m-K and a heat of evaporation of 2462 J/g. If a layer of liquid water 1.2 mm thick is maintained between the first surface of heat exchanger 2 and the selective transfer membrane 1, a conductive heat flux of 500 W/m$^2$ can be maintained for every 1 K of temperature difference across that liquid water. In turn, this conductive heat flux drives the evaporation of 0.73 kg/hr of water per square meter of membrane and 1 K temperature difference without any bulk mass flow of the water working fluid 6. In certain embodiments, working fluid 6 is substantially stagnant in the working fluid compartment.

Evaporative Chilling Systems

In another aspect, the present disclosure provides of an evaporative chilling system utilizing an evaporative membrane chiller with a vapor compressor. In certain embodiments, the evaporative chilling system can be an air conditioning system, which will be used herein for an illustrative description of an exemplary embodiment. In one embodiment, the air conditioning system includes: a chiller as described herein, a compressor to compress water vapor transferred through the membrane from the working fluid and evaporated into the chamber; a condenser to condense the compressed water vapor into a condensate; and a pathway to return the condensate to the working fluid compartment.

A typical application of an air conditioning system involves reducing the temperature and humidity of air inside an enclosure (the process fluid) while moving the excess heat and humidity outside the enclosure to an environment that is warmer and has a higher vapor pressure, conditions that prevent spontaneous transfer in the desired direction. Many of these same principles can be readily applied in slightly different circumstances, such as to control the vapor pressure of a fluid other than water, but in the system shown in FIG. 3, water is illustrated as an exemplary working fluid. In brief, a process fluid (usually, but not exclusively, air) is conditioned (adjusted for desirable temperature and concentration of selected vapors) by means of latent energy exchange across a selectively permeable material (hereafter referred to as a membrane). Sensible energy is exchanged from the process fluid to a working fluid (usually, but not exclusively, water) through heat exchangers, but the temperature of the working fluid is controlled by latent energy exchange across the membrane.

Figure 3:
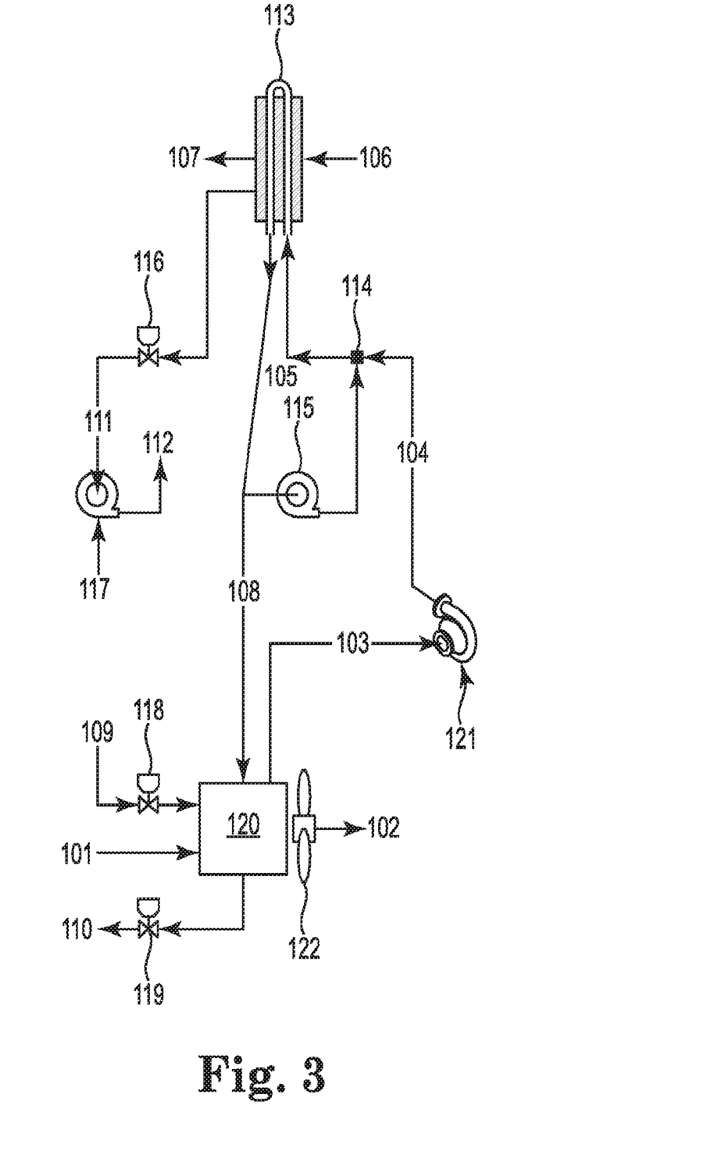
FIG. 3 is a schematic illustration of an exemplary embodiment of an evaporative chilling system utilizing a compact membrane chiller with a vapor compressor.

FIG. 3 is a schematic illustration of an exemplary embodiment of an evaporative chilling system (e.g., an air conditioning system) utilizing an evaporative membrane chiller with a vapor compressor.

Referring to FIG. 3, the air conditioning system includes compact membrane chiller 120, which can be similar to compact membrane chiller 10 illustrated in FIGS. 1 and 2. For simplicity, all the features of compact membrane chiller 120 are not illustrated in FIG. 3, but compact membrane chiller 120 typically contains some of the features of compact membrane chiller 10, and in some embodiments, compact membrane chiller 120 contains all the features of compact membrane chiller 10.

In the exemplary embodiment illustrated in FIG. 3, the process fluid is air and the working fluid is water. Compact membrane chiller 120 includes process air inlet 101 and process air exit 102. The flow of process air into inlet 101 and out of exit 102 can be controlled by operation of supply fan 122. Compact membrane chiller 120 also includes make-up valve 118 for adding additional make-up water through inlet 109. Compact membrane chiller 120 also includes drain valve 119 for draining working fluid and any dissolved solids through drain 110.

FIG. 3 illustrates transfer of water working fluid vapor 103 from the vapor chamber of compact evaporative chiller 120 to vapor compressor 121. In some embodiments, vapor compressor 121 is a mechanical vapor compressor. In certain embodiments, vapor compressor is an electrochemical vapor compressor.

Vapor compressor 121 can compress water working fluid vapor 103 such that compressed water vapor 104 can be cooled by a second working fluid stream in condenser 113 (e.g., a sensible condenser) that can provide condensed water working fluid 108 in a liquid state. An exemplary second working fluid stream used in condenser 113 is illustrated in FIG. 3 with outside air 106 entering condenser 113 and exhaust air 107 exiting condenser 113. Alternatively, condenser 113 can be cooled by a different fluid (e.g., liquid water) or by a different mechanism (e.g., radiative cooling, conduction to a solid reservoir like the ground, thermoelectric cooling, and the like).

Optionally, compressed water vapor 104 can be further cooled by passing through desuperheat spray nozzle 114 (further discussed below) to remove excess heat and provide cooled water vapor 105 prior to passing the water vapor to condenser 113. Desuperheat spray nozzle and metering pump 115 are included for embodiments in which compressed water vapor 104 has gained more temperature in the compression process than desired (for instance, condenser 113 may have material temperature limitations). In this use, spraying a small, metered amount of atomized condensate 108 into the vapor stream can create additional evaporative cooling that can lower the vapor temperature. As long as condenser 113 is properly sized, the additional vapor load can be recovered. Metering the flow rate can control the temperature of the water vapor entering condenser 113, but the loop can be shut down or eliminated from the bill of materials and the system can still operate without that form of temperature control.

Sensible condenser 113 can be a fluid cooling condenser, a radiative cooling condenser, a conductive cooling condenser, a thermoelectric cooling condenser, or a combination thereof. In certain embodiments, sensible condenser 113 is an air cooled or water cooled sensible condenser.

In certain embodiments, the air conditioning system includes a pathway configured to return the condensed working fluid to compact membrane chiller 120. In certain embodiments, compact membrane chiller 120 includes metering pump 115 configured to optionally divert a portion of the condensed working fluid from the return pathway to desuperheat spray nozzle 114 configured to spray atomized condensed working fluid into the vapor stream between the compressor and the condenser to create additional evaporative cooling.

In certain embodiments, the pathway to return the condensed water working fluid 108 to the working fluid compartment of compact membrane chiller 120 is configured to maintain the working fluid compartment at a pressure less than or equal to the pressure inside condenser 113, which can allow condensate 108 to return to the working fluid compartment of compact membrane chiller 120 under the influence of gravity and/or pressure differentials. In some embodiments, condensate 108 is returned to the working fluid compartment of compact membrane chiller 120 without the input of additional mechanical energy to move condensate 108. Because compact membrane chiller 120 does not require a high circulation flow rate, the system can be configured for gravity return of the condensed water working fluid 108 to compact membrane chiller 120, which means that the water working fluid can operate in compact membrane chiller 120 at the saturation pressure maintained in condenser 113. This pressure is a function of the design operating temperatures in condenser 113 and can be almost any value relative to atmospheric pressure, but in the majority of cooling situations it may be significantly lower than the ambient absolute pressure.

In certain embodiments, the air conditioning system also includes roughing pump 117 connected to condenser 113 through isolation valve 116 and configured to optionally remove non-condensable gases 111 to ambient air 112. Because it may be desirable to draw the system down to the correct operating pressure and periodically remove noncondensable gases that build up in the condenser, the system can typically be fitted with a roughing vacuum pump that operates intermittently. This process inevitably draws some of the working fluid molecules out with the noncondensables, so the system can be provided with make-up valve 118 that allows for the initial fill of the system with the working fluid and a periodic replenishment to maintain the correct levels. Considering the pressure differential that is likely to exist, most make-up systems may not require additional pumping; the working fluid can spray into the low pressure system. It may be advantageous to locate this make-up system in a location where any noncondensable gases present in the make-up fluid can be captured and removed. Finally, the system may be equipped with drain valve 119, although a low-pressure system may use a system purge to raise the internal pressure to ambient before any fluids can drain.

Figure 4:
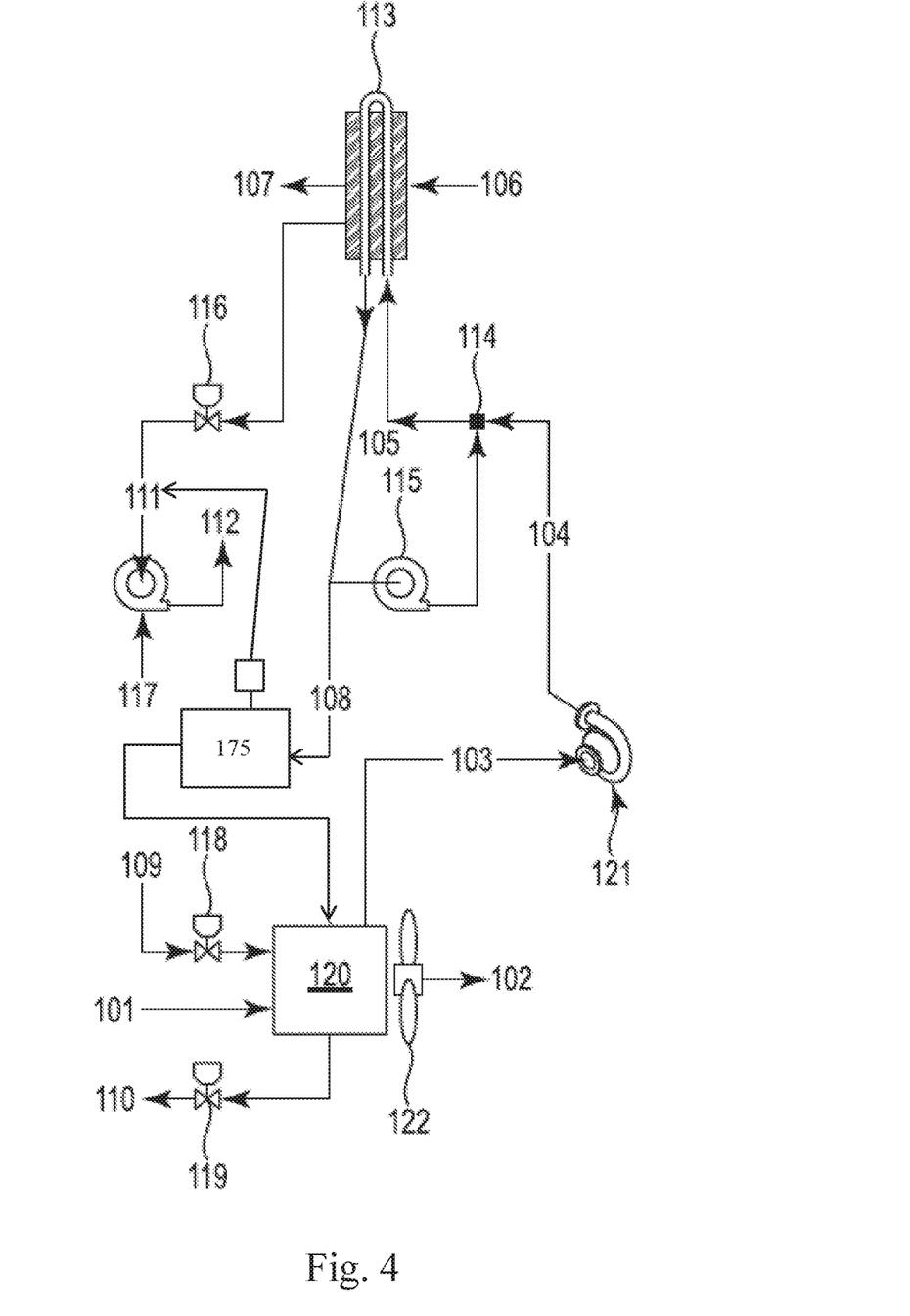
FIG. 4 is a schematic illustration of an exemplary embodiment of an evaporative chilling system utilizing a compact membrane chiller with a vapor compressor and a pressure regulation device.

Referring to Fi sure 4, in certain embodiments in which vapor compressor 121 is an electrochemical compressor, the air conditioning system can further include a pressure regulation device 175 configured to accept a mixture of water working fluid vapor 103 and electrochemical carrier gas or gases from the return condensed working fluid pathway at a first pressure, and configured to reduce that pressure to a second, lower pressure that is sufficient to return the condensed working fluid to the working fluid compartment of compact membrane chiller 120 without compromising the partial pressure of the working fluid in the vapor chamber of compact membrane chiller 120.

In some embodiments, condensed working fluid can be removed from the chiller system and additional working fluid can be provided to the working fluid compartment, allowing the generation of a purified working fluid that has been distilled through the selective transfer membrane of compact membrane chiller 120, while other species and impurities have been removed from the working fluid compartment of compact chiller 120 by draining a portion of the concentrated working fluid through drain valve 119 to drain 110.

Condenser 113 can optionally include a second selective transfer membrane, and the compressed vapor can be presented to a first surface of the second selective transfer membrane, and an exhaust fluid can be presented to a second surface of the second selective transfer membrane, wherein a partial pressure of the working fluid in the exhaust fluid is lower than the partial pressure of the working fluid at the first surface of the second selective transfer membrane, causing the transport of working fluid through the second selective transfer membrane.

In certain embodiments, the water working fluid can further include at least one additional component that does not readily transfer through the selective transfer membrane of compact membrane chiller 120, and the water working fluid and the at least one additional component can be in the form of a mixture, suspension, emulsion, slurry, colloid, or combination thereof.

In another aspect, the present disclosure provides a method of chilling air using an air conditioning system as described herein. In one embodiment, the method includes: providing an inflow of uncooled process air into the heat exchanger and an outflow of cooled process air out of the heat exchanger, wherein the heat exchanger is adjacent the first side of the first selective transfer membrane, and wherein the heat exchanger is configured to isolate the water working fluid from the process air; providing the water working fluid in the working fluid compartment between the first selective transfer membrane and the heat exchanger to provide at least a film of the water working fluid adjacent the first side of the first selective transfer membrane and the first side of the heat exchanger; maintaining a partial pressure of the water working fluid in the vapor chamber adjacent the second side of the first selective transfer membrane that is lower than the partial pressure of the water working fluid in the working fluid compartment, resulting in transfer through the membrane and evaporation of at least a portion of the water working fluid into the chamber as water vapor, wherein the evaporation of water working fluid causes sufficient heat to be transferred from the working fluid chamber to maintain the working fluid at a lower temperature than the process air, which thus causes heat to be drawn from the process air so that the process air outflow is at a lower temperature than the process air inflow; compressing the water vapor; transferring the compressed water vapor to a condenser to condense the compressed water vapor into a condensate; and returning the condensate to the working fluid compartment.

In certain embodiments, the inflowing uncooled air 101 can be at a temperature of −1° C. (30° F.) to 60° C. (140° F.). In certain embodiments, the outflowing cooled air 102 can be at a temperature of −3° C. (26° F.) to 59° C. (139° F.).

In certain embodiments, the water working fluid can be maintained in the working fluid chamber of compact membrane chiller 120 at an average temperature of −4° C. (25° F.) to 59° C. (138° F.). In some embodiments, the partial pressure of the water working fluid in the vapor chamber of compact membrane chiller 120 is maintained at less than 47 kPa absolute pressure.

In certain embodiments, the distance across the working fluid from the surface of heat exchanger to the selective transfer membrane of compact membrane chiller 120 is sufficiently small such that conductive heat transfer through that film is effective to transfer a desired quantity of heat from the process fluid to the evaporative surface of the selective transfer membrane of compact membrane chiller 120.

In certain embodiments, the water working fluid can be maintained at a temperature in the working fluid compartment of compact membrane chiller 120 no higher than a chosen design value, without maintaining a mass flow of the water working fluid 6. In certain embodiments, the working fluid may be water with a thermal conductivity of 0.6 W/m-K and a heat of evaporation of 2462 J/g. If a layer of liquid water 1.2 mm thick is maintained between the first surface of heat exchanger 2 and the selective transfer membrane 1, a conductive heat flux of 500 W/m$^2$ can be maintained for every 1 K of temperature difference across that liquid water. In turn, this conductive heat flux drives the evaporation of 0.73 kg/hr of water per square meter of membrane and 1 K temperature difference without any bulk mass flow of the water working fluid 6. In certain embodiments, the working fluid is substantially stagnant in the working fluid compartment of compact membrane chiller 120.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A compact membrane evaporative chiller for cooling a process fluid comprising:
    a first selective transfer membrane;
    a heat exchanger adjacent a first side of the first selective transfer membrane, the heat exchanger configured to provide an inflow of uncooled process fluid into the heat exchanger and an outflow of cooled process fluid out of the heat exchanger;
    a working fluid compartment between the first selective transfer membrane and the heat exchanger configured to physically isolate a working fluid from the process fluid, wherein the working fluid compartment is in direct physical contact with both the first selective transfer membrane and the heat exchanger such that the working fluid compartment provides at least a film of the working fluid that is simultaneously in contact with both the first side of the first selective transfer membrane and a first side of the heat exchanger; and
    a vapor chamber adjacent a second side of the first selective transfer membrane configured to maintain a partial pressure of the working fluid in the chamber less than a partial pressure of the same fluid in the working fluid compartment and to collect vapor of the working fluid transferred through the first selective transfer membrane and evaporated into the vapor chamber, wherein the compact membrane evaporative chiller is configured for transfer of heat from the heat exchanger to the working fluid in the working fluid compartment.

2. The chiller of claim 1, wherein the working fluid in the vapor chamber is maintained at an absolute pressure less than atmospheric pressure.

3. The chiller of claim 1, wherein the heat exchanger comprises metal, plastic, ceramic, or a composite surface.

4. The chiller of 1, wherein the working fluid compartment comprises a mesh or a porous foam capable of being filled with the working fluid.

5. The chiller of claim 4, wherein the mesh or porous foam comprises metal, plastic, ceramic, composite, or combinations thereof.

6. The chiller of claim 1, further comprising a compressor to compress the vapor of the working fluid transferred through the first selective transfer membrane and evaporated into the vapor chamber such that the pressurized vapor is cooled by a second working fluid stream in a condenser that provides condensed working fluid in a liquid state.

7. The chiller of claim 6, wherein the chiller further comprises a pathway configured to return condensed working fluid to the working fluid compartment.

8. The chiller of claim 6, wherein the compressor is a mechanical vapor compressor or an electrochemical vapor compressor.

9. The chiller of claim 6, wherein the condenser is a sensible condenser.

10. The chiller of claim 8, wherein the sensible condenser is a selected from the group consisting of a fluid cooling condenser, a radiative cooling condenser, a conductive cooling condenser, a thermoelectric cooling condenser, and combinations thereof.

11. The chiller of claim 8, wherein the sensible condenser is an air cooled or water cooled sensible condenser.

12. The chiller claim 6, further comprising a metering pump configured to optionally divert a portion of the condensed working fluid from the return pathway to a desuperheat spray nozzle configured to spray atomized condensed working fluid into the vapor stream between the compressor and the condenser to create additional evaporative cooling.

13. The chiller of claim 6, further comprising a roughing pump connected to the condenser through an isolation valve and configured to optionally remove non-condensable gases.

14. The chiller of claim 6, wherein the pathway to return the condensed working fluid to the working fluid compartment is configured to maintain the working fluid compartment at a pressure less than or equal to the pressure inside the condenser, which allows the condensate to return to the working fluid compartment under the influence of gravity and/or pressure differentials.

15. The chiller of claim 6, wherein the compressor is an electrochemical compressor, and the system further comprises a pressure regulation device configured to accept a mixture of working fluid vapor and electrochemical carrier gas or gases from the return condensed working fluid pathway at a first pressure, and configured to reduce that pressure to a second, lower pressure such that the condensed working fluid returns to the working fluid compartment of the chiller without compromising the partial pressure of the working fluid in the vapor chamber.

16. The chiller of claim 1, wherein the working fluid compartment further comprises an inlet for adding additional working fluid and/or a drain for draining working fluid and any dissolved solids.

17. The chiller of claim 6, wherein the chiller is configured such that condensed working fluid is removed from the chiller system and additional working fluid is provided to the working fluid compartment, allowing the generation of a purified working fluid that has been distilled through the first selective transfer membrane, while other species and impurities have been removed from the working fluid compartment by draining a portion of the concentrated working fluid.

18. The chiller of claim 6, wherein the condenser comprises a second selective transfer membrane, and the compressed vapor is presented to a first surface of the second selective transfer membrane, and an exhaust fluid is presented to a second surface of the second selective transfer membrane, wherein a partial pressure of the working fluid in the exhaust fluid is lower than the partial pressure of the working fluid at the first surface of the second selective transfer membrane, causing the transport of working fluid through the second selective transfer membrane.

19. The chiller of claim 1, wherein the working fluid further comprises at least one additional component that does not readily transfer through the first selective transfer membrane, and the working fluid and the at least one additional component are in the form of a mixture, suspension, emulsion, slurry, colloid, or combination thereof.

* * * * *